United States Patent [19]

Carmichael

[11] Patent Number: 5,419,203
[45] Date of Patent: May 30, 1995

[54] FLOW METER HAVING A CONTOURED PLUG AND RESILIENT MEANS

[75] Inventor: Richard Q. Carmichael, Huntley, United Kingdom

[73] Assignee: Spirax-Sarco Limited, United Kingdom

[21] Appl. No.: 132,321

[22] Filed: Oct. 6, 1993

[30] Foreign Application Priority Data

Oct. 15, 1992 [GB] United Kingdom ............... 9221669
Feb. 8, 1993 [GB] United Kingdom ............... 9302433

[51] Int. Cl.$^6$ ............................................. G01F 1/22
[52] U.S. Cl. ........................................... 73/861.58
[58] Field of Search ............ 73/861.58, 861.53, 861.54, 73/861.71, 861.72, 861.74, 861.75, 861.76

[56] References Cited

U.S. PATENT DOCUMENTS 3,147,620  9/1964  Stapler .......................... 73/861.74
3,287,971  11/1966 Bahniuk ......................... 73/861.58
4,955,270  9/1990  Volk ............................. 73/861.71

FOREIGN PATENT DOCUMENTS 1043059  9/1966  United Kingdom .

Primary Examiner—Richard E. Chilcot, Jr.
Assistant Examiner—Harshad Patel
Attorney, Agent, or Firm—Willian Brinks Hofer Gilson & Lione

[57] ABSTRACT

A target meter comprises a plug 12 which is movable relatively to an orifice plate 8 against a spring 20. The spring transfers the force on the plug 12 to an abutment 26, 42. The force applied to the support 26, 42 is detected by strain gauges 30, 44 and the signals from the strain gauges are processed to provide a measure of the flow rate or of the pressure drop across the orifice plate 8.

15 Claims, 1 Drawing Sheet

FLOW METER HAVING A CONTOURED PLUG AND RESILIENT MEANS

BACKGROUND OF THE INVENTION

The present invention relates to target meters.

Target meters operate on the principle that the force acting on a body suspended within a conduit in which fluid flows is related to the mass flow rate of the fluid. Velocity changes around the body result in pressure changes and the drag force on the body results from the pressure differences between the upstream and downstream surfaces. A known target meter comprises a drag plate situated within a conduit which is attached to a support member which extends to the outside of the conduit and is pivotable relatively to the conduit about a fulcrum. The force acting on the support tube, and tending to turn it about the fulcrum, is measured. Such a target meter is shown and described in section 3.2.7.3 of British Standard BS 7405. A disadvantage of the known target meter is that it has a non-linear response. Also, the fulcrum is prone to damage.

SUMMARY OF THE INVENTION

According to the present invention there is provided a fluid flow meter comprising a conduit having a constriction in which a contoured plug is situated, the plug being axially displaceable, against resilient means, under a pressure difference across the constriction, thereby to vary the flow cross-section of the constriction, the resilient means acting between the plug and an abutment, measurement means being provided, which is responsive to the force applied by the resilient means on the abutment, for providing a signal representing the flow rate through the conduit.

The plug is preferably mounted on a shaft which extends longitudinally within the conduit and the abutment may comprise an annular member disposed around the shaft.

In one embodiment, a stop may be provided to limit axial movement of the abutment. Preferably, a support connects the abutment to the measurement means. The measurement means may comprise a strain bridge having strain probes disposed on opposite sides of the support so as to be responsive to deflection of the support.

In an alternative embodiment, the abutment comprises a body, defining a chamber, within which there are disposed measurement elements. The body may comprise an annular cylindrical housing disposed around the shaft, the resilient means abutting a flexible diaphragm forming an end wall of the body. Preferably, the measurement elements comprise strain gauges which are responsive to the deflection of the diaphragm, and there may be provided four high temperature compensated strain gauges. Preferably a connection member passes from the enclosed body to the exterior of the conduit, wires being enclosed within the connection member which transfer signals from the measurement elements.

In either embodiment, the contoured plug may be shaped so as to produce a linear relationship between the force on the plug and the flow rate of fluid in the conduit.

DETAILED DESCRIPTION OF THE INVENTION

Figure 1:
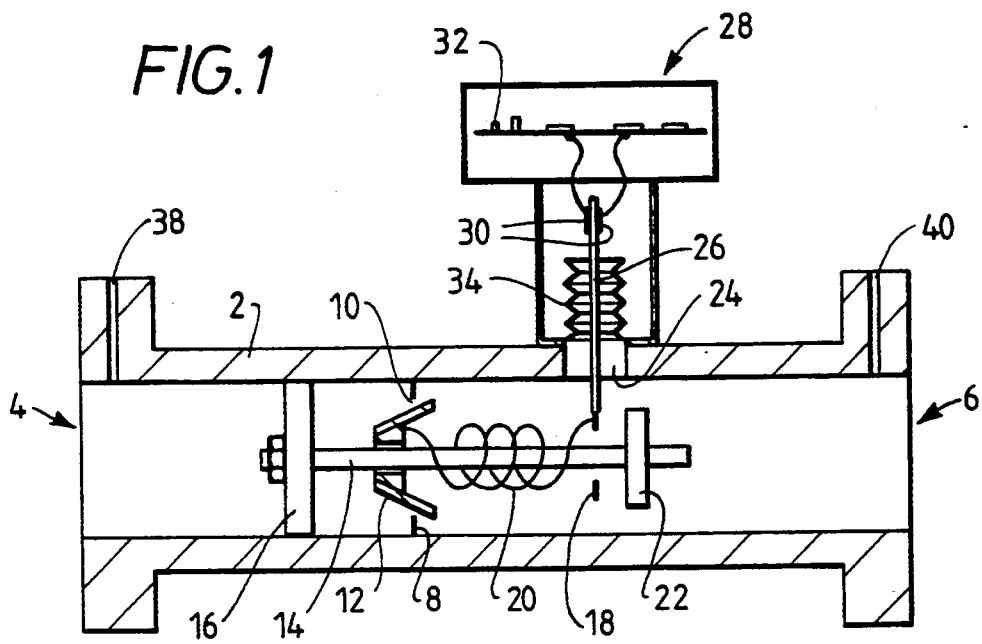
FIG. 1 shows a fluid flow meter.

The flow meter shown in FIG. 1 comprises a conduit having an inlet 4 and an outlet 6. An orifice plate 8 is secured within the conduit 2 and has an opening 10. An axially slidable cone shaped plug 12 provides a variable restriction to the size of the opening 10. The plug 12 is slidable along a shaft 14 which is secured to a supporting member 16 situated within the conduit 2.

Downstream of the plug 12 and also disposed around the shaft 14 there is an abutment in the form of an annular pressure plate 18. A spring 20 extends axially within the conduit 2 between the plug 12 and the pressure plate 18. Further downstream of the pressure plate 18 there is a stop 22 which is secured to the shaft 14.

An aperture 24 is provided in the conduit 2 at the same longitudinal position along the conduit as the pressure plate 18. A support 26 extends radially outwardly from the pressure plate 18, through the aperture 24 and out to an external sensing system 28. At its end away from the pressure plate 18, the support 26 is cantilevered on a mounting body (not shown) which is fixed to the conduit 2. The sensing system 28 comprises two strain probes 30 which are positioned on opposite sides of the support 26 and which constitute a strain bridge. The signals from the strain bridge are fed to a circuit 32 which amplifies the strain signals received from the strain bridge and converts them into signals representing flow rate within the conduit 2.

The elements of the circuit 32 and the strain bridge are isolated from the interior of the pipe by means of bellows 34, which contains the internal pressure within the pipe 2 while allowing the support 26 to flex with little resistance. Expansion of the bellows 34 is prevented by virtue of its connection to the support 26.

In use, fluid enters the inlet 4 of the pipe 2 and flows freely within the pipe to the orifice plate 8. A variable opening is provided between the external surface of the cone shaped plug 12 and the opening 10 in the orifice plate 8. Depending upon the rate of flow of fluid within the pipe, a force will be exerted on the plug 12 by the fluid at the inlet side of the pipe. This force causes the plug 12 to slide axially along the shaft 14 to increase the size of the variable opening. Movement of the plug 12 is resisted by the spring 20, and the spring, in turn, exerts a force on the pressure plate 18. For steady flow, the plug 12 will reach an equilibrium position, for which a certain force is exerted on the pressure plate 18. This force tends to flex the support 26 and the resulting bending strain is measured by the strain bridge, comprising the strain probes 30. The sensing system 28 then determines the flow rate from the strain readings obtained. The flow rate is thus determined from the force applied by the flowing fluid on the plug 12, independently of the pressure drop across the orifice plate 8. However, if knowledge of the pressure drop is required, then the circuit 32 can be adapted to provide this information from the strain gauge outputs.

In the event of excess flow through the system, the stop 22 provides an abutment for the pressure plate 18 when the force exerted on the pressure plate surpasses those forces to be expected under normal operating conditions. The plug 12 can nevertheless continue to move towards the pressure plate 18 by compression of the spring 20. The stop 22 transfers the excess loading to the support 16 and so provides protection against damage to the support member 26.

Figure 2:
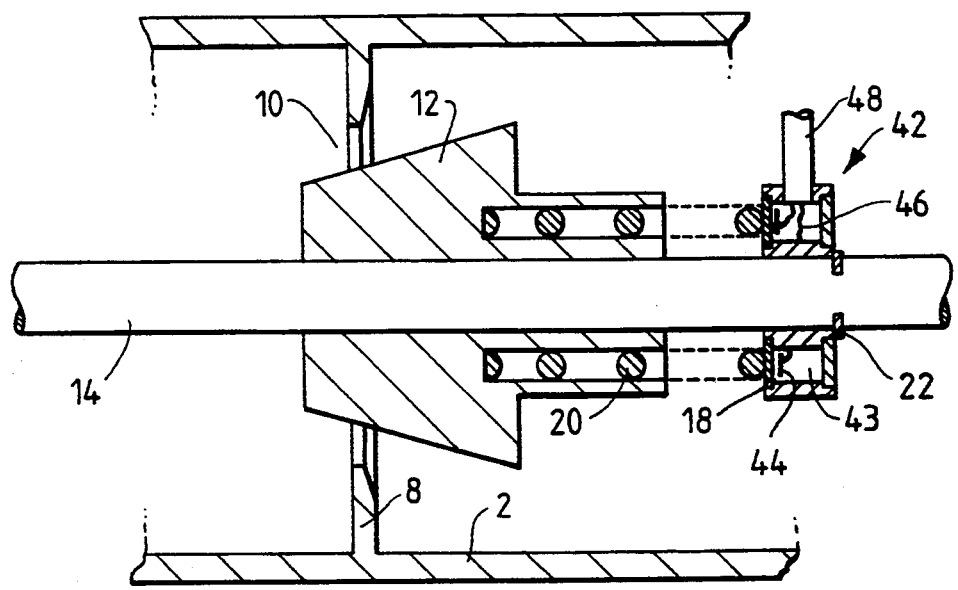
FIG. 2 shows a variant of the fluid flow meter of FIG. 1.

The variant shown in FIG. 2 includes many of the features shown in FIG. 1 and like components are given the same references. As in the embodiment shown in FIG. 1, a contoured plug 12 is mounted on a shaft 14, the contoured plug providing a variable restriction to the size of an opening 10 in an orifice plate 8. A spring 20 extends axially within the conduit 2 between the plug 2 and a pressure plate 18. The flow measurement system shown in FIG. 2 comprises a capsule 42 which is disposed around the shaft 14. The capsule is configured as a toroid, for example comprising a cylindrical annulus. The capsule is thus an enclosed body, having an internal volume 43. One face of the capsule, which acts as the pressure plate 18, provides an abutment for the spring 20 and consists of a diaphragm. A number of high temperature strain gauges 44 are provided, attached to the side of the diaphragm 18 opposite to the spring 20. There may, for example, be four compensated gauges 44. The capsule is filled with a medium such that the gauges may remain serviceable at high temperatures. This medium may for example be an inert gas, a vacuum, air or a plastics material.

Wires 46 extend from the gauges 44 and are fed, via a metal tube 48, to the exterior of the conduit 2. The wires 46 are sealed within the tube 48 to prevent leakage of the medium within the capsule 42. The position of the capsule 42 may be selected by means of a stop 22 which provides an abutment against which the capsule 42 is pressed by the action of the spring 20.

The flow meter shown in FIG. 2 operates on the same principles as that shown in FIG. 1. However, in the flow meter shown in FIG. 2, the capsule 42 does not move and consequently a less complex structure for the passage of the tube 48 to the exterior of the conduit 2 is required. The force exerted by the spring 20 on the diaphragm 18 causes the diaphragm 18 to deflect. The capsule 42, however, remains stationary during operation of the system. Deflection of the diaphragm 18 is detected by the strain gauges 44 which provide a strain output signal according to the load applied to them. These signals pass via the wires 46 through the tube 48 to external circuitry (not shown). The strain signals obtained can again be directly related to the flow rate within the conduit 2. However, the meter shown in FIG. 2 provides additional advantages resulting from the use of the capsule. For example, it is possible to measure static pressure by incorporating a pressure measurement device within the capsule. Furthermore, the incorporation of a temperature sensor will provide a means of temperature measurement for use in density compensation. The capsule therefore may provide a means for deriving the true mass flow rate, including pressure and density compensation.

In both embodiments, the cone shaped plug 12 preferably has a particular configuration which is designed such that there is a linear relationship between the flow rate within the conduit 2 and the strain measurements, which simplifies calibration of the device. Furthermore, the design of the cone shaped plug and the opening in the orifice plate results in the fluid meter being capable of operating over a large range of flow rates, while maintaining a linear relationship between the pressure drop across the meter and the flow rate.

Pressure tappings 38 and 40 may be provided so that meter calibration can be checked in service without disturbing any internal components of the meter. A differential pressure transducer is connected across the tappings 38 and 40 while flow takes place through the meter, and the resulting reading and the output from the circuit 32 are compared with the original factory calibration to determine whether or not the meter continues to function properly.

What is claimed is:

1. A fluid flow meter comprising:
   a conduit;
   a constriction provided within the conduit;
   a contoured plug situated, at least partly, within the constriction;
   an abutment which is supported within the conduit at a position axially spaced from the constriction;
   resilient means which extends and acts between the contoured plug and the abutment whereby a pressure difference cross the constriction causes axial displacement of the plug thereby to vary the flow cross-section of the constriction, such axial displacement causing a force to be applied to the abutment by the resilient means; and
   measurement means coupled to the abutment, the measurement means being responsive to the force applied to the abutment by the resilient means, the measurement means thereby providing a signal representing the flow rate through the conduit.

2. A fluid flow meter as claimed in claim 1 in which there is further provided a shaft which extends longitudinally within the conduit, the contoured plug being mounted on the shaft.

3. A fluid flow meter as claimed in claim 2, in which the abutment comprises an annular member disposed around the shaft.

4. A fluid flow meter as claimed in claim 2, in which the abutment comprises a body which defines a chamber, the measurement means comprising measurement elements which are disposed within the chamber.

5. A fluid flow meter as claimed in claim 4, in which the body comprises an annular cylindrical housing disposed around the shaft and in which the body has an end wall in the form of a flexible diaphragm, the resilient means abutting the flexible diaphragm.

6. A fluid flow meter as claimed in claim 5, in which the measurement elements comprise strain gauges which are responsive to deflection of the diaphragm.

7. A fluid flow meter as claimed in claim 6, in which there are provided four high temperature compensated strain gauges.

8. A fluid flow meter as claimed in claim 7, in which a connection member is provided which passes from the body to the exterior of the conduit, wires being provided which are enclosed within the connection member, the wires transferring signals from the measurement elements.

9. A fluid flow meter as claimed in claim 1 in which the resilient means comprises a spring.

10. A fluid flow meter as claimed in claim 1 in which the contoured plug is shaped such that the flow cross-section of the constriction varies with the axial displacement of the plug so as to produce a linear relationship between the force exerted on the abutment by the resilient means and the flow rate of fluid in the conduit.

11. A fluid flow meter as claimed in claim 1 in which there is further provided a stop which limits axial movement of the abutment.

12. A fluid flow meter as claimed in claim 1 in which the conduit has an outer wall, the outer wall being provided with an aperture and in which the fluid flow meter further comprises a support which passes through the aperture in the wall of the conduit, the abutment being connected to the support.

13. A fluid flow meter as claimed in claim 12, in which the support has a first end which is connected to the abutment and a second end which is fixed with respect to the conduit.

14. A fluid flow meter as claimed in claim 13, in which the measurement means is responsive to deflection of the support relatively to the conduit.

15. A fluid flow meter as claimed in claim 14, in which the support has a first side facing an upstream direction and a second side facing a downstream direction, and in which the measurement means comprises a strain bridge having strain probes disposed on the first and second sides of the support.

* * * * *